United States Patent

Apitz

[15] 3,637,163

[45] Jan. 25, 1972

[54] ARRANGEMENT FOR THE TAPE-END SWITCH-OFF FOR MAGNETIC TAPE RECORDERS, IN PARTICULAR CASSETTE RECORDERS

[72] Inventor: Siegfried Apitz, Pforzheim, Germany

[73] Assignee: International Standard Electric Corporation, New York, N.Y.

[22] Filed: Mar. 31, 1970

[21] Appl. No.: 24,290

[30] Foreign Application Priority Data

Apr. 9, 1969 Germany ....................... P 19 18 097.3

[52] U.S. Cl. .............................................................242/191

[51] Int. Cl. .................B65h 59/38, G03b 1/02, G11b 15/13

[58] Field of Search ..........................................242/186–191

[56] References Cited

UNITED STATES PATENTS 2,676,212 4/1954 Williams .............................179/100.2

3,285,525 11/1966 Buckler ................................242/187

3,433,428 3/1969 Schatteman ...........................242/191

3,480,230 11/1969 Hosono et al..........................242/191

*Primary Examiner*—Leonard D. Christian

*Attorney*—C. Cornell Remsen, Jr., Walter J. Baum, Percy P. Lantzy, Philip M. Bolton, Isidore Togut and Charles L. Johnson, Jr.

[57] ABSTRACT

An arrangement is provided for the automatic tape-end switch-off for cassette recorders. Two rotary movements are developed in the recorder via the takeup spindle, pulleys and a flywheel mass. End of tape results in a change of direction of the first rotary movement with respect to the second. The change in direction is converted into either an axial or radial movement which effects switch-off.

3 Claims, 7 Drawing Figures

INVENTOR
SIEGFRIED APITZ
BY Philip M. Bolton
ATTORNEY

INVENTOR
SIEGFRIED APITZ
BY Philip M. Bolton
ATTORNEY

ARRANGEMENT FOR THE TAPE-END SWITCH-OFF FOR MAGNETIC TAPE RECORDERS, IN PARTICULAR CASSETTE RECORDERS

BACKGROUND OF THE INVENTION

The present invention relates to an arrangement for the automatic tape-end switch-off for magnetic tape recorders and, more particularly, for cassette recorders.

In magnetic tape recorders it is necessary to perform a tape-end switch-off upon reaching the end of the tape. Numerous kinds of automatic tape-end switch-off arrangements are already known. For constructional reasons, however, these conventional types of arrangements are in most cases not applicable to cassette recorders.

Automatic tape-end switch-off arrangements are also already known for cassette recorders. These however, are constructionally very expensive because of electromagnetic releasing elements which are controlled by electronic or photoelectric scanning or sensing devices.

SUMMARY OF THE INVENTION

It is an object of the present invention to provide a simple arrangement for effecting automatic tape-end switch-off which requires a very small expenditure on components.

According to the broader aspects of the invention I have provided an arrangement for switching-off a cassette tape recorder at the end of the tape comprising: tape takeup means; a shaft rotatably coupled to said takeup means having a helically extending groove, an idle-running groove and a return groove extending in a stepped fashion with respect to said idle-running groove; a first rotating element axially mounted on said shaft and fastened firmly thereto; a second rotating element axially mounted for free rotation on said shaft; means for driving said second rotating element at a lower rotational speed than said first rotating element; means for detecting the relative change in rotational direction between said first and said second rotating elements when said first rotating element is caused to stop by the end of the tape; means for converting said relative change in rotational direction into an axial or radial movement; and means responsive to said axial or radial movement for effecting switch-off of said recorder.

The foregoing and other objects of the invention will be better understood from the following description and reference to the accompanying drawings, in which:

BRIEF DESCRIPTION OF THE DRAWINGS

FIGS. 3 and 4 are schematic reviews which show details relating to FIG. 2 (detail "A"), on an enlarged scale; and FIGS. 4 to 7 are schematic reviews which show details relating to a modified embodiment of the invention.

DESCRIPTION OF THE PREFERRED EMBODIMENTS

Figure 1:
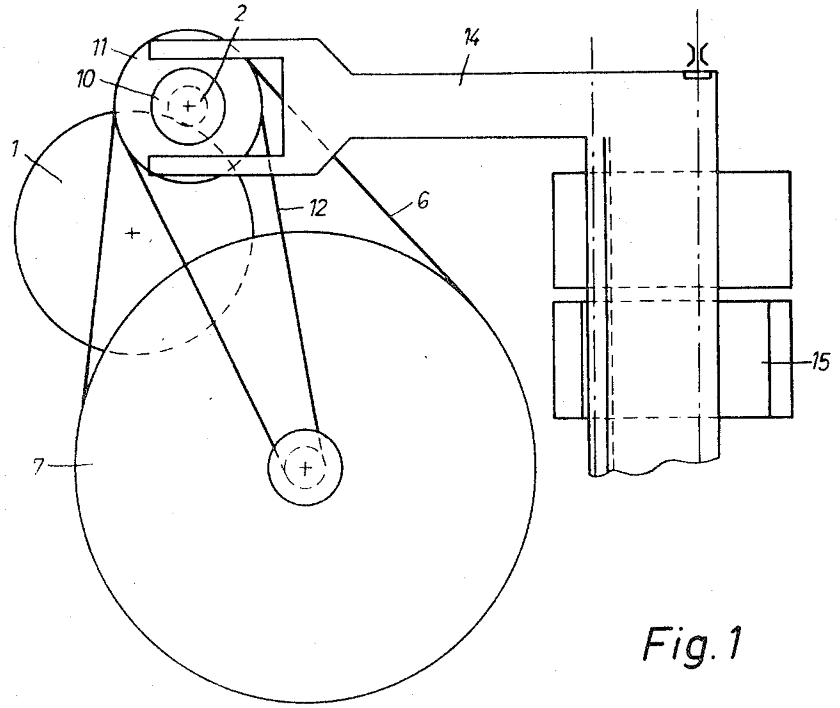
FIG. 1 shows an embodiment of the present invention in a schematical bottom view representation.
Figure 2:
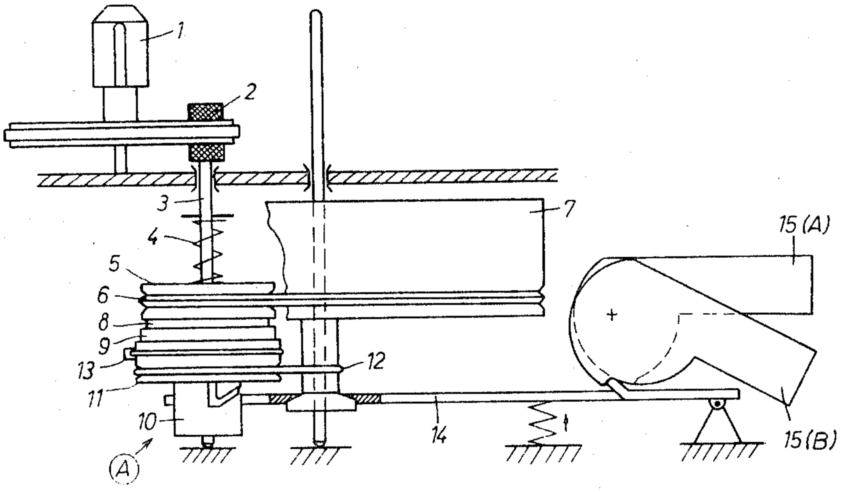
FIG. 2 shows the example of embodiment of FIG. 1 in a side view, partly taken in a sectional elevation.
Figures 3, 4, 5, 6, 7:
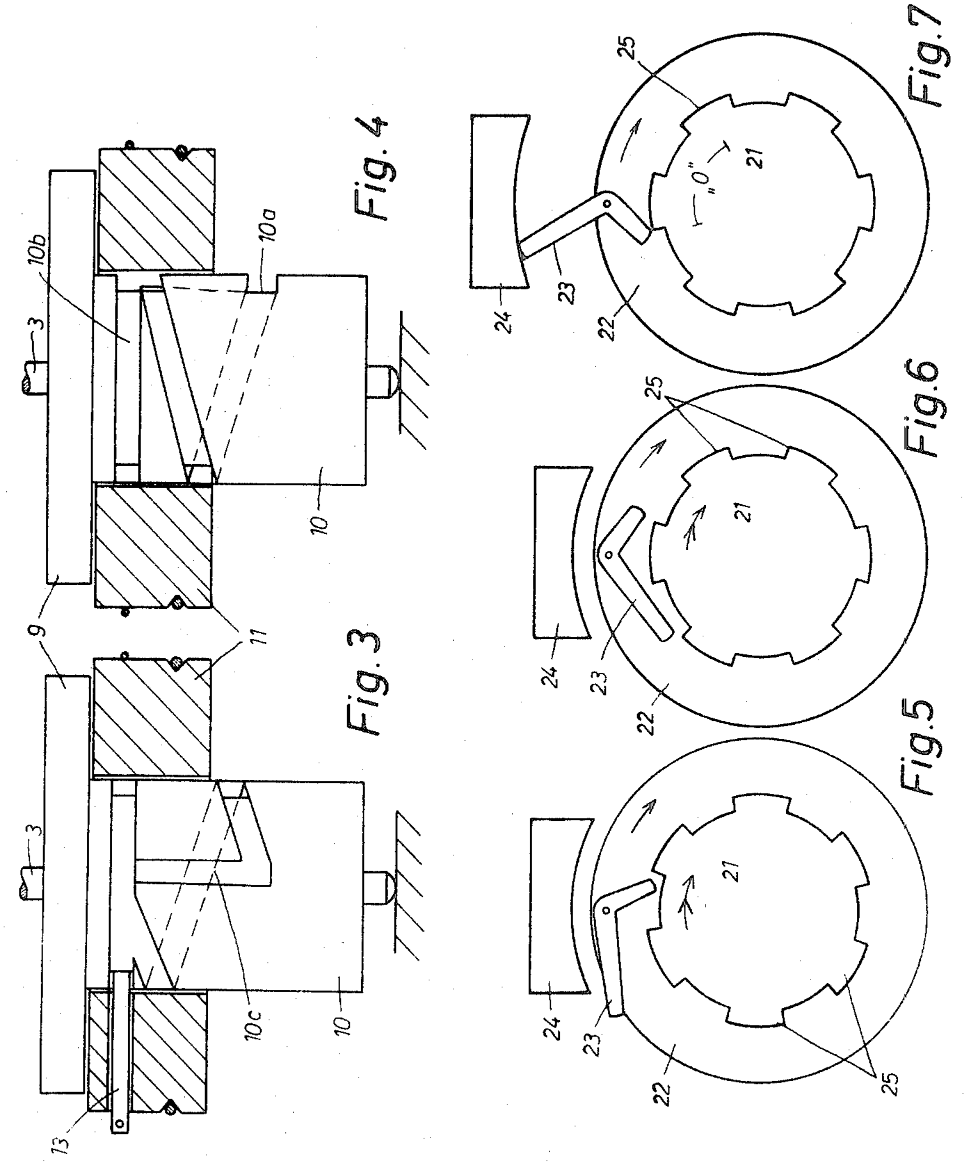

The takeup spindle 1 as shown in FIGS. 1 and 2, is assumed to form part of a "reel-to-reel" type tape cassette and is assumed to effect, during operation, the winding up of the tape behind the sound shaft of the cassette recorder. The takeup spindle 1 is driven by a friction wheel 2 seated on the shaft 3 of a friction clutch aggregate which is driven by the flywheel mass 7 via the belt 6 and the freely rotatable belt pulley 5. Rotational speed adaptation is effected in the known manner in that the clutch lining 8 transfers the rotary movement of the belt pulley 5 to the abutment 9 which is firmly connected to the shaft 3, corresponding to the torque which is adjustable by the spring 4. The part 10 of the abutment 9 which is firmly connected to the shaft 3 and therefor firmly coupled to the movement of the tape via the takeup spindle 1, is provided with a helical groove 10*a* (FIG. 4). A belt pulley 11 which is loosely seated on the part 10, and pin 13 resiliently arranged therein, engages the groove and is moved in the axial direction of the shaft 3 in dependence upon the rotational movement of part 10 in relation to the belt pulley 11.

When the recorder is operating the flywheel mass 7 will start to rotate and will drive, via the belt 6, the friction or slipping clutch members 8 and 9 and consequently, the takeup spindle 1. As long as the tape has not been unwound to the end, or blocked in some other way, the shaft 3 rotates and, therewith, the part 10. At the same time, via the flywheel mass 7 and the belt 12, the belt pulley 11 is rotated in the same direction of rotation as the part 10 on which it rotates, but at a lower rotational speed which is due to a different transmission ratio. In this condition the belt pulley 11 will remain axially in the position shown in FIG. 2, because the helical groove 10*a*, under the now prevailing conditions of relative movement, will guide it in this direction (towards the abutment 9), into the idle-running groove 10*b*.

Upon stopping of the tape, the fixed tape end will effect a stopping of the takeup spindle 1 and, consequently, of the shaft 3. Since now the rotational speed of part 10 equals zero, the belt pulley rotates at a higher speed and, consequently, the relative movement or the direction of movement of part 10 in relation to the belt pulley 11 is reversed. Owing to the helical groove 10*a* there is now effected an axial movement of the belt pulley 11 in opposition to the direction of part 9 and, consequently, towards a releasing lever 14 of the operating key aggregate, which is mounted on this part 9. Thus, the key aggregate is released, with the pushbutton key 15 being moved from its operating positions 15 (B)(operating condition of the recorder) into its off position 15 (A). Instead of the releasing lever 14, the belt pulley 11 might just as well actuate a switching contact.

The helical groove is designed in such a way that the belt pulley 11 which is guided in it by means of the pin 13, is returned to the idle-running groove 10*b* after having performed one complete rotation, via return groove 10*c* (FIG. 3). Thus, the tape end switch-off device is neutralized after the switching-off operation.

The return groove 10*c* extends towards the idle-running groove 10*b* by departing somewhat from the axis, so that when entering this groove, the resilient guide pin 13 is prevented from entering the return groove 10*c*.

Both the pushbutton key 15 and the releasing lever 14 may also be designed in such a way that the releasing lever 14, in the operating condition of the key 15, is not applied to the belt pulley 11, whereas it, in the nonoperating condition of key 15, will act upon the belt pulley 11 until reaching the normal position (i.e., pin 13 in the idle-running groove 10*b*), by the action of its reset spring force, so that an additional spring element for neutralizing the switch-off device may be omitted.

If, for constructional reasons, an axial switch-off movement cannot be performed, it is possible, as shown in FIGS. 5, 6 and 7, to derive a radial switch-off movement from the relative movement of the rotatable elements. In the arrangement shown in these drawings, the rotating element 21 may be compared to the structural part 10 as shown in FIGS. 1 to 4, and the rotating element 22 may be compared to part 11 as shown in FIGS. 1 to 4. A two-armed lever 23 is rotatably pivoted within the range of the face side of the rotating element 22, and is retained in the position shown in FIG. 5, for example, by a torsion spring. Since the rotating element 21 is coupled to the takeup spindle 1, it has a higher rotational speed in the normal operating case than the rotating element 22. The cams 25 attached to the rotating element 21, will meet against the end of the shorter lever arm of the two-armed lever 23, for causing the latter to perform an anticlockwise excursion in the way shown in FIGS. 5 and 6.

FIG. 7 shows the mode of operation of the switch-off device upon stopping of the tape. The standstill of the rotating element 21 as caused by the tape stop and further rotational movement of the rotating element 22, cause the two-armed lever 23 to overtake the cams 25 which are now at a standstill. The longer arm of the lever is considerably deflected in a clockwise direction by the cams 25, via the short lever arm, thus meeting against the releasing lever 24 for actuating the latter.

I claim:

1. An arrangement for switching-off a cassette tape recorder at the end of the tape comprising:

tape takeup means;

a shaft rotatably coupled to said takeup means having a helically extending groove, an idle-running groove and a return groove extending in a stepped fashion with respect to said idle-running groove;

a first-rotating element axially mounted on said shaft and fastened firmly thereto;

a second-rotating element axially mounted for free rotation on said shaft;

means for driving said second rotating element at a lower rotational speed than said first-rotating element;

means for detecting the relative change in rotational direction between said first and said second-rotating elements when said first-rotating element is caused to stop by the end of the tape;

means for converting said relative change in rotational direction into an axial or radial movement; and means responsive to said axial or radial movement for effecting switch-off of said recorder.

2. An arrangement according to claim 1, wherein said means for driving said second rotating element includes:

a flywheel mass;

a belt pulley coupled to and freely rotatable on said shaft and coupled to said flywheel mass for setting said flywheel mass into rotational motion; and means for guiding said belt pulley into said idle-running groove via said helically extending groove during operation of the recorder and for guiding said belt pulley into said idle-running groove via said return groove after one complete rotation of said shaft after switch-off.

3. An arrangement according to claim 1, wherein said means responsive includes:

at least one pushbutton key; and means for releasing said pushbutton key at end of tape.

* * * * *